(12) United States Patent
Shimodaira et al.

(10) Patent No.: US 10,071,483 B2
(45) Date of Patent: Sep. 11, 2018

(54) ROBOT, ROBOT CONTROL APPARATUS, ROBOT CONTROL METHOD, AND ROBOT SYSTEM

(71) Applicant: Seiko Epson Corporation, Tokyo (JP)

(72) Inventors: Yasuhiro Shimodaira, Matsumoto (JP); Masakazu Kobayashi, Shiojiri (JP)

(73) Assignee: Seiko Epson Corporation (JP)

( * ) Notice: Subject to any disclaimer, the term of this patent is extended or adjusted under 35 U.S.C. 154(b) by 44 days.

(21) Appl. No.: 15/170,034

(22) Filed: Jun. 1, 2016

(65) Prior Publication Data
US 2016/0354928 A1 Dec. 8, 2016

(30) Foreign Application Priority Data

Jun. 2, 2015 (JP) ................................. 2015-111967

(51) Int. Cl.
| | | |
|---|---|---|
| *B25J 9/16* | (2006.01) | |
| *B25J 13/08* | (2006.01) | |
| *B25J 17/02* | (2006.01) | |

(52) U.S. Cl.
CPC ........... *B25J 9/1687* (2013.01); *B25J 9/1633* (2013.01); *B25J 9/1679* (2013.01); *B25J 13/085* (2013.01); *B25J 17/0208* (2013.01); *G05B 2219/39319* (2013.01); *G05B 2219/39321* (2013.01); *G05B 2219/39322* (2013.01);
(Continued)

(58) Field of Classification Search
CPC ...... B25J 9/1687; B25J 9/1633; B25J 13/085; B25J 17/0208; G05B 2219/40031; G05B 2219/40032; G05B 2219/40033; G05B 2219/39319; G05B 2219/39321;
(Continued)

(56) References Cited

U.S. PATENT DOCUMENTS

| | | | |
|---|---|---|---|
| 5,619,782 | A | 4/1997 | Tanaka et al. |
| 2010/0057256 | A1 | 3/2010 | Sato et al. |

(Continued)

FOREIGN PATENT DOCUMENTS

| | | |
|---|---|---|
| JP | 07-096427 A | 4/1995 |
| JP | 07-227725 A | 8/1995 |

(Continued)

OTHER PUBLICATIONS

Extended European Search Report for Patent Application No. EP 16172138.6 dated Dec. 1, 2016 (10 pages).

*Primary Examiner* — Spencer D Patton
(74) *Attorney, Agent, or Firm* — Harness, Dickey & Pierce, P.L.C.

(57) ABSTRACT

A robot includes an arm that has a plurality of arm members, a drive unit driving the plurality of arm members, and a grasp unit; and a force detector. The robot sequentially performs a contact operation in which a fitting member grasped by the grasp unit is moved in a predetermined contact direction and is brought into contact with a to-be-fitted member, a posture change operation in which a posture of the fitting member is changed to a fitting posture, and a fitting operation in which the fitting member in the fitting posture is moved in a searching direction and the fitting member is fitted into the to-be-fitted member in a fitting direction. The contact direction, the searching direction, and the fitting direction are directions different from one another.

5 Claims, 5 Drawing Sheets

(52) U.S. Cl.
CPC .............. *G05B 2219/39332* (2013.01); *G05B 2219/40032* (2013.01); *G05B 2219/40033* (2013.01); *G05B 2219/45055* (2013.01); *Y10S 901/09* (2013.01)

(58) Field of Classification Search
CPC ........... G05B 2219/39322; G05B 2219/45055; G05B 2219/40028
See application file for complete search history.

(56) References Cited

U.S. PATENT DOCUMENTS

| | | | |
|---|---|---|---|
| 2010/0256818 A1* | 10/2010 | Aoba | ..................... B25J 9/1612 700/275 |
| 2011/0225787 A1 | 9/2011 | Sato et al. | |
| 2012/0317535 A1 | 12/2012 | Schmirgel et al. | |

FOREIGN PATENT DOCUMENTS

| | | |
|---|---|---|
| JP | 2010-142909 A | 7/2010 |
| JP | 2012-115912 A | 6/2012 |
| JP | 5545534 B2 | 7/2014 |
| WO | WO-2009-057416 A2 | 5/2009 |

\* cited by examiner

ROBOT, ROBOT CONTROL APPARATUS, ROBOT CONTROL METHOD, AND ROBOT SYSTEM

BACKGROUND

1. Technical Field

The present invention relates to a robot, a robot control apparatus, a robot control method, and a robot system.

2. Related Art

There is a known technique in which a cylindrical attachment component is fitted into a cylindrical attachment hole so that the axial centers thereof coincide with each other (refer to JP-A-7-227725). In JP-A-7-227725, the axial centers of the attachment component and the attachment hole coincide with each other by causing the attachment component to approach the vicinity of the attachment hole in a state where the axial centers thereof become parallel to each other, and then, causing the attachment component to rotate while being misaligned from the center of the attachment hole and being brought into contact with the attachment hole in a state where the attachment component is tilted.

In JP-A-7-227725, a posture when the attachment component is fitted into the attachment hole is a posture in which the axial center of the attachment component becomes parallel to the axial center of the attachment hole. However, depending on the shapes of the components, there are cases where the components cannot approach each other while being in postures necessary to be fitted. In other words, when the components are caused to approach each other while being in the postures when being fitted, the components interfere with each other, thereby resulting in a problem in that the components cannot approach each other.

SUMMARY

An advantage of some aspects of the invention is to provide a technique in which members incapable of being fitted while being in fitting postures can be fitted.

A robot according to an aspect of the invention includes an arm that has a plurality of arm members, a drive unit driving the plurality of arm members, and a holding unit; and a force detector. The robot sequentially performs a contact operation in which a fitting member held by the holding unit is moved in a predetermined contact direction and is brought into contact with a to-be-fitted member, a posture change operation in which a posture of the fitting member is changed to a fitting posture, and a fitting operation in which the fitting member in the fitting posture is moved in a searching direction and the fitting member is fitted into the to-be-fitted member in a fitting direction. The contact direction, the searching direction, and the fitting direction are directions different from one another.

According to this configuration, in the fitting operation, the fitting member in the fitting posture is fitted into the to-be-fitted member in the fitting direction. In contrast, in the contact operation, the fitting member is in a posture different from the fitting posture, and the fitting member makes an approach in the contact direction different from the fitting direction. In other words, the posture and the moving direction of the fitting member are different between the fitting operation and the contact operation. Therefore, when the fitting member in the fitting posture is moved in the fitting direction with respect to the to-be-fitted member with no change, even in a case where an interference structure in which the to-be-fitted member and the fitting member interfere with each other is provided, the fitting member can be brought into contact with the to-be-fitted member while avoiding the interference structure.

Functions of the respective members described in the appended claims are implemented by a hardware resource in which the function is specified through its configuration, a hardware resource in which the function is specified through a program, and a combination thereof. The functions of the respective members are not limited to those which are implemented through a hardware resource in a manner physically independent from one another.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1A:
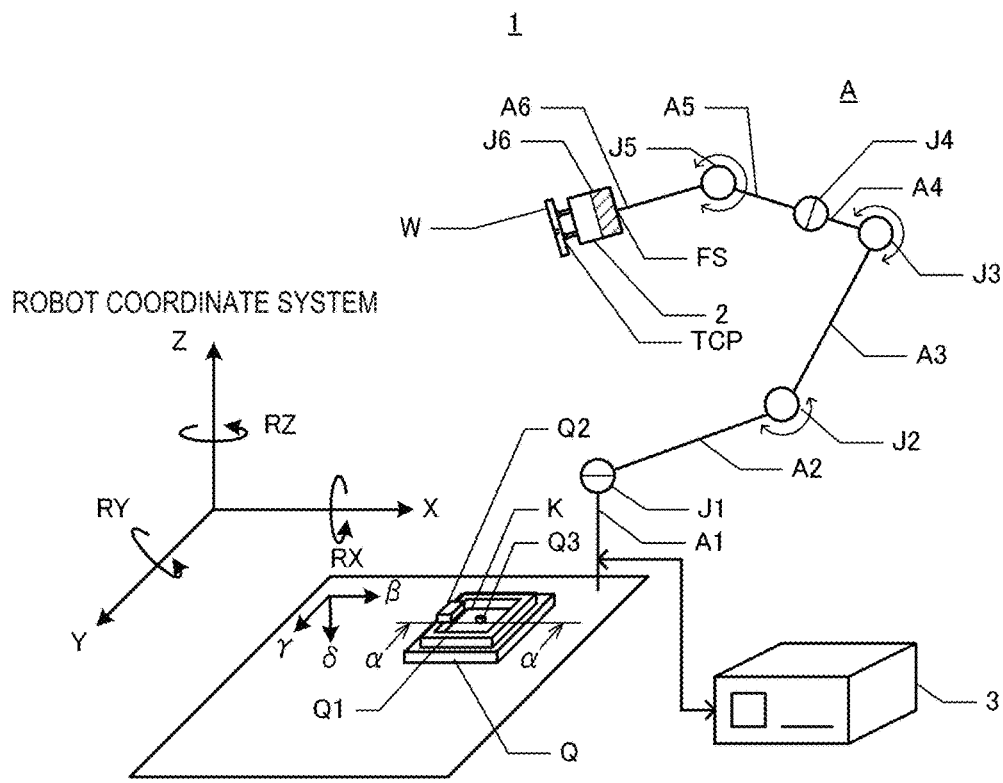
FIG. 1A is a schematic view of a robot system.

Hereinafter, embodiments of the invention will be described with reference to the accompanying drawings in the following order. In each of the drawings, the same reference numerals and signs are applied to the corresponding configuration elements and description thereof will not be repeated.

1. Configuration of Robot System
2. Fitting Work
3. Other Embodiments

1. Configuration of Robot System

As illustrated in FIG. 1A, a robot system according to a first example of the invention includes a robot 1, an end effector 2, and a control apparatus 3 (controller). The control apparatus 3 is configured to be a robot control apparatus according to the invention. The control apparatus 3 may be a dedicated computer or may be a general-purpose computer in which a program for the robot 1 is installed.

The robot 1 is a single arm robot having one arm A. The arm A has six joints J1 to J6. Six arm members A1 to A6 are connected through the joints J1 to J6. The joints J2, J3, and J5 are bend joints, and the joints J1, J4, and J6 are roll joints. The end effector 2 which is a grasp unit for suctioning and grasping a fitting member W is mounted in the joint J6. A tool center point (TCP) indicates a predetermined position of the end effector 2. A position of the TCP serves as a reference for positions of various types of end effectors 2. The joint J6 is also provided with a force sensor FS serving as a force detector. The force sensor FS is the force detector for six axes. The force sensor FS detects the magnitude of forces applied to three detection axes which are orthogonal to one another and the magnitude of torque around the three detection axes.

In FIG. 1A, the end effector 2 suctioning the fitting member W is mounted at the tip of the joint J6. A robot coordinate system indicates a coordinate system defining a space in which the robot 1 is installed. The robot coordinate system is a three-dimensional orthogonal coordinate system defined by an X-axis and a Y-axis which are orthogonal to each other in a horizontal plane and a Z-axis of which the positive direction is upward in the vertical direction. RX indicates a rotary angle around the X-axis, RY indicates a rotary angle around the Y-axis, and RZ indicates a rotary angle around the Z-axis. An arbitrary position in a three-dimensional space can be expressed with positions in X, Y, and Z-directions, and an arbitrary posture (rotary direction) in the three-dimensional space can be expressed with rotary angles in RX, RY, and RZ-directions. The same postures denote that all the rotary angles in the RX, RY, and RZ-directions coincide with one another. However, the positions in the X, Y, and Z-directions may be different from one another. Hereinafter, in a case where a position is indicated, the term can also denote a posture. In a case where a force is indicated, the term can also denote torque which acts in the RX, RY, and RZ-directions. The control apparatus 3 controls the position of the TCP in the robot coordinate system by driving the arm A.

Figure 1B:
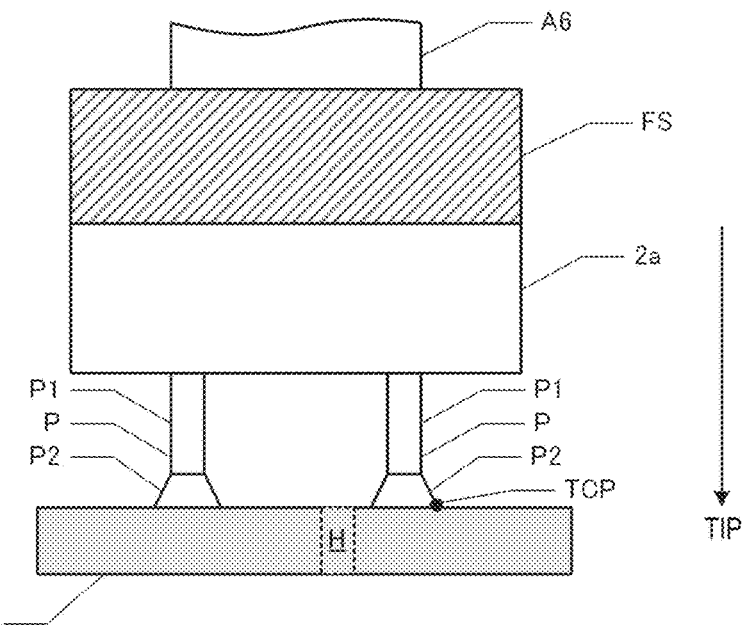
FIG. 1B is a side view of an end effector.

FIG. 1B is a side view of the end effector 2 suctioning the fitting member W. The end effector 2 includes a base portion 2a which is bonded to the force sensor FS, and a vacuum chuck P which extends from the base portion 2a toward the tip side of the arm A. The vacuum chuck P includes an elastic portion P1 and a suctioning portion P2. The elastic portion P1 serving as an elastic member is formed with a metal spring which extends and shrinks in the length direction of the arm A. The suctioning portion P2 is a tubular rubber member in which a columnar internal space open toward the tip side of arm A is formed. As the tip of the suctioning portion P2 adheres to the fitting member W, the internal space of the suctioning portion P2 becomes a closed space. As a suction pump (not illustrated) is driven in this state, the internal space of the suctioning portion P2 is in a vacuum so that the fitting member W can be suctioned and grasped. In the present embodiment, the position of the tip of any one of the suctioning portions P2 (right side in FIG. 1B) is defined as the TCP. In FIG. 1B, two vacuum chucks P are illustrated. However, the number of the vacuum chucks P is not limited. Hereinafter, suctioning of the fitting member W performed by the end effector 2 will be simply indicated as grasping of the fitting member W performed by the arm A. The fitting member W is not necessarily suctioned. For example, the fitting member W may be grasped by a gripper gripping the fitting member W.

Figure 2:
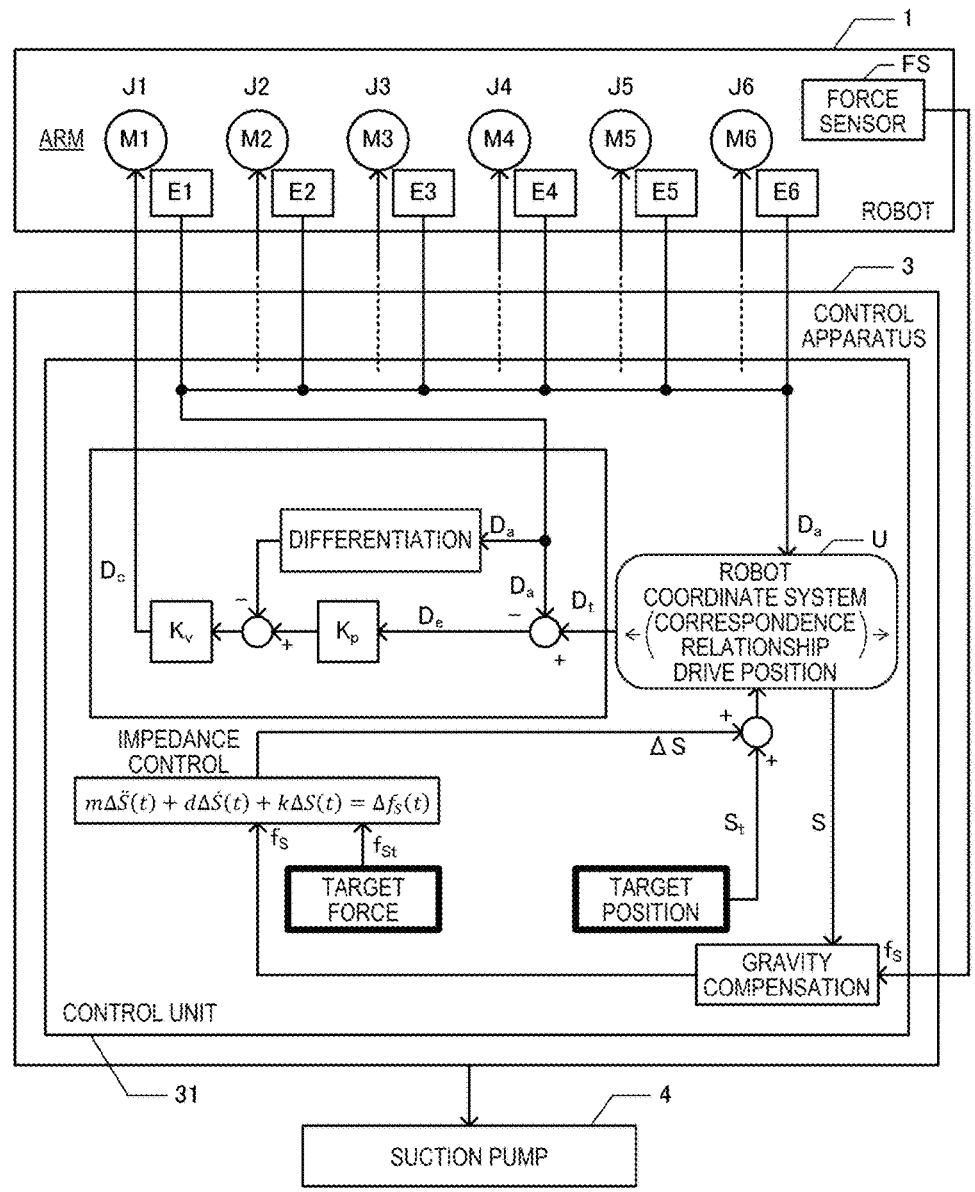
FIG. 2 is a block diagram of the robot system.

FIG. 2 is a block diagram of the robot system. A control program for controlling the robot 1 is installed in the control apparatus 3. The control apparatus 3 has a control unit 31 which is a computer including a processor, a RAM, and a ROM. A hardware resource of the control unit 31 works together with the control program.

The control unit 31 controls the arm A so that a target position and a target force set through teaching performed by a user are realized at the TCP. The target force is a force to be detected by the force sensor FS. The letter S indicates any one direction among directions (X, Y, Z, RX, RY, and RZ) of axes defining the robot coordinate system. For example, in a case of S=X, an X-direction component of the target position set in the robot coordinate system is indicated as $S_t=X_t$, and an X-direction component of the target force is indicated as $f_{St}=f_{Xt}$. The letter S also indicates a position (rotary angle) in an S-direction.

In addition to the configuration illustrated in FIGS. 1A and 1B, the robot 1 includes motors M1 to M6 which are drive units, and encoders E1 to E6. The motors M1 to M6 and the encoders E1 to E6 are included so as to respectively correspond to the joints J1 to J6, and the encoders E1 to E6 detect drive positions of the motors M1 to M6. Controlling of the arm A denotes controlling of the motors M1 to M6. The control unit 31 can communicate with the robot 1. The control unit 31 stores combinations of the drive positions of the motors M1 to M6, and a correspondence relationship U with respect to the position of the TCP in the robot coordinate system. The control unit 31 stores a target position $S_t$ and a target force $f_{St}$ for every process of the work performed by the robot 1. The target position $S_t$ and the target force $f_{St}$ are set in the control unit 31 in advance by performing teaching.

When drive positions $D_a$ of the motors M1 to M6 are acquired, the control unit 31 converts the drive positions $D_a$ into positions S (X, Y, Z, RX, RY, and RZ) of the TCP in the robot coordinate system based on the correspondence relationship U. In the robot coordinate system, the control unit 31 specifies an action force $f_S$ actually acting on the force sensor FS, based on the position S of the TCP and a detection value of the force sensor FS. The force sensor FS detects the detection value in a unique coordinate system. However, since the relative positions and directions of the force sensor FS and the TCP are stored as known data, the control unit 31 can specify the action force $f_S$ in the robot coordinate system. The control unit 31 performs gravity compensation with respect to the action force $f_S$. The gravity compensation denotes elimination of gravity components from the action force $f_S$. The action force $f_S$ after being subjected to the gravity compensation can be considered as a force other than the gravity acting on the fitting member. The gravity components of the action force $f_S$ acting on the fitting member for every posture of the TCP are researched in advance, and the control unit 31 realizes the gravity compensation by subtracting the gravity components corresponding to the postures of the TCP from the action force $f_S$.

The control unit 31 specifies a force-originated correction amount ΔS by substituting the target force $f_{St}$ and the action force $f_S$ in a motion equation of impedance control. Equation (1) is the motion equation of impedance control.

$$m\Delta \ddot{S}(t)+d\Delta \dot{S}(t)+k\Delta S(t)=\Delta f_S(t) \tag{1}$$

The left side of Equation (1) is configured to have a first member in which a second-order differential value of the position S of the TCP is multiplied by a virtual inertia coefficient m, a second member in which a differential value of the position S of the TCP is multiplied by a virtual viscosity coefficient d, and a third member in which the position S of the TCP is multiplied by a virtual elastic coefficient k. The right side of Equation (1) is configured to have a force deviation $\Delta f_S$ (t) obtained by subtracting an actual force f from the target force $f_{St}$. Differentiation in Equation (1) denotes differentiation in time. In the process performed by the robot 1, there is a case where a constant value is set as the target force $f_{St}$, and there is a case where a value derived through a function depending on time is set as the target force $f_{St}$.

The impedance control is control for realizing virtually mechanical impedance through the motors M1 to M6. The virtual inertia coefficient m denotes mass which the TCP virtually has, the virtual viscosity coefficient d denotes viscous resistance which the TCP virtually receives, and the virtual elastic coefficient k denotes a spring constant of an elastic force which the TCP virtually receives. The parameters m, d, and k may be set to values different from one another for every direction or may be set to have a common value regardless of direction. The force-originated correction amount ΔS denotes the required magnitude of movement of the position S of the TCP in order to cancel the force deviation $\Delta f_S$ (t) with respect to the target force $f_{St}$ in a case where the TCP receives mechanical impedance. The control unit 31 specifies a corrected target position $(S_t+\Delta S)$ in which the impedance control is considered, by adding the force-originated correction amount $\Delta S$ to the target position $S_t$.

Based on the correspondence relationship U, the control unit 31 converts the corrected target position $(S_t+\Delta S)$ in a direction of each axis defining the robot coordinate system into a target drive position $D_t$ which is a target drive position of each of the motors M1 to M6. The control unit 31 calculates a drive position deviation $D_e$ (=$D_t-D_a$) by subtracting an actual drive position $D_a$ of the motors M1 to M6 from the target drive position $D_t$. The control unit 31 specifies a controlled variable $D_c$ by adding a value obtained by multiplying the drive position deviation $D_e$ by a position control gain $K_p$, and a value obtained by multiplying a drive speed deviation which is a time differential value of the actual drive position $D_a$, that is, a difference with respect to a drive speed by a speed control gain $K_v$. The position control gain $K_p$ and the speed control gain $K_v$ may include not only a proportional component but also a control gain applied to a differentiation component or an integral component. The controlled variable $D_c$ is specified for each of the motors M1 to M6. According to the above-described configuration, the control unit 31 can control the arm A based on the target position $S_t$ and the target force $f_{St}$.

Control for causing an actual action force $f_S$ to be the target force $f_{St}$ is force control, and control for causing an actual position S of the TCP to be the target position $S_t$ is position control. In the present embodiment, the control unit 31 can perform both the position control and the force control, or only the position control in accordance with the contents of the operation. For example, regardless of the actual action force $f_S$, it is possible to substantially perform only the position control by considering that the force-originated correction amount $\Delta S$ in FIG. 2 is zero at all times.

The control unit 31 also controls the operation of a suction pump 4. The suction pump 4 is connected to the vacuum chuck P through an air tube (not illustrated). The control unit 31 operates the suction pump 4 so that the internal space of the suctioning portion P2 of the vacuum chuck P is in a vacuum.

2. Fitting Work

Fitting work is work for causing the fitting member W in FIGS. 1A and 1B to be fitted into a to-be-fitted member Q in FIG. 1A. When performing the fitting work, it is considered that an installation position and an installation direction of the to-be-fitted member Q are known in the robot coordinate system and the control unit 31 can acquire the installation position and the installation direction of the to-be-fitted member Q. It is considered that an installation position and an installation direction of the fitting member W before being grasped by the arm A are also known in the robot coordinate system and the control unit 31 can acquire the installation position and the installation direction of the fitting member W based on the position of the TCP when the fitting member W is suctioned. However, an error can be included in the installation positions and the installation directions of the to-be-fitted member Q and the fitting member W acquired by the control unit 31. The robot system may be provided with a camera for performing image recognition of the to-be-fitted member Q and the fitting member W.

The fitting member W is formed to have an approximately rectangular plate shape. As illustrated in FIG. 1A, a recessed portion K having a shape slightly greater than the fitting member W is formed in the to-be-fitted member Q (grey), and the fitting member W can be fitted into the recessed portion K. The to-be-fitted member Q is formed to have an approximately rectangular shape in a planar view. Hereinafter, the shape of the to-be-fitted member Q is indicated through the orthogonal coordinate system in which a β-axis, a γ-axis, and a δ-axis are orthogonal to one another. The to-be-fitted member Q is a rectangular plate-shaped member similar to the fitting member W, and the rectangle thereof is configured to have sides in a β-direction and sides in a γ-direction. The to-be-fitted member Q is placed on the horizontal plane (XY-plane), and the β-direction and the γ-direction become directions which are present approximately within the horizontal plane. A δ-direction orthogonal to a βγ-plane is a direction of which the positive direction is downward from the to-be-fitted member Q placed on the horizontal plane, and the recessed portion K is open in the δ-axis negative direction. The δ-direction is an approximately vertical downward-direction. As described above, since the installation position and the installation direction of the to-be-fitted member Q are known, the control unit 31 can acquire the β, γ, and δ-directions in the robot coordinate system.

Figure 3A:
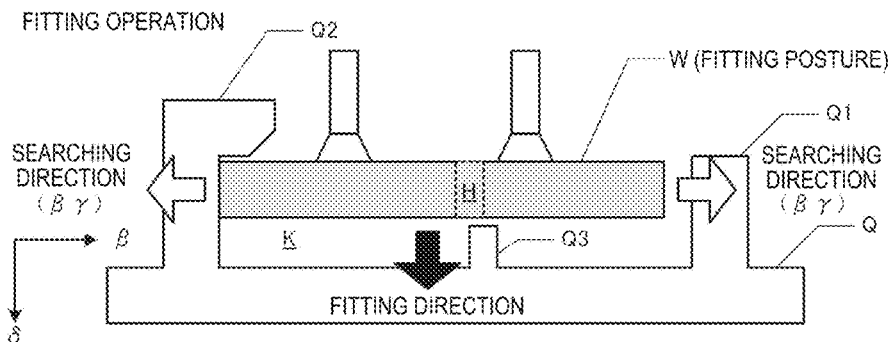
FIGS. 3A and 3B are side views of a fitting member.
Figure 3B:
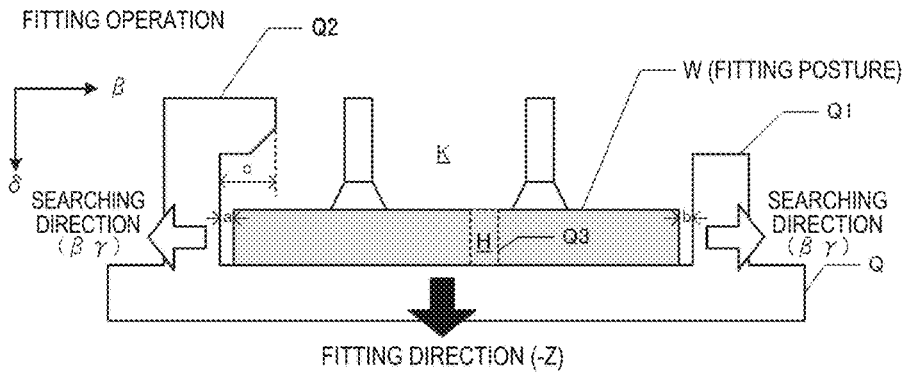

In the fitting work, the control unit 31 causes the robot 1 to sequentially perform a preparation operation, a contact operation, a posture change operation, and a fitting operation. First, the fitting operation will be described by using FIGS. 3A and 3B. FIGS. 3A and 3B are arrow views taken along line α-α (FIG. 1A) illustrating a state of the fitting member W in the fitting operation. The line α-α is a straight line penetrating the axial center of the to-be-fitted member Q in the β-direction.

As illustrated in FIGS. 3A and 3B, in the fitting operation, the arm A grasping the fitting member W is controlled so that a columnar boss Q3 protruding from the to-be-fitted member Q in the δ-axis negative direction is fitted into a fitting hole H formed in the fitting member W. Here, the columnar fitting hole H is formed perpendicularly to the plane direction of the fitting member W. A fitting posture which is a posture of the fitting member W when the boss Q3 is fitted into the fitting hole H becomes a posture in which the plane direction becomes the direction of the βγ-plane (approximately horizontal direction). Specifically, the control unit 31 controls the arm A so that a plane in which the tips of the suctioning portions P2 are present becomes parallel to the βγ-plane. Since the tips of the suctioning portions P2 are present on a plane parallel to the βγ-plane, the posture of the fitting member W in which the plane direction becomes parallel to the βγ-plane basically becomes the fitting posture. However, there are cases where the elastic portion P1 of the vacuum chuck P unevenly extends depending on the center position of gravity of the fitting member W or the suctioning position of the suctioning portion P2. Therefore, in the fitting posture, the plane direction of fitting member W can be misaligned from the direction of the βγ-plane.

Figure 3C:
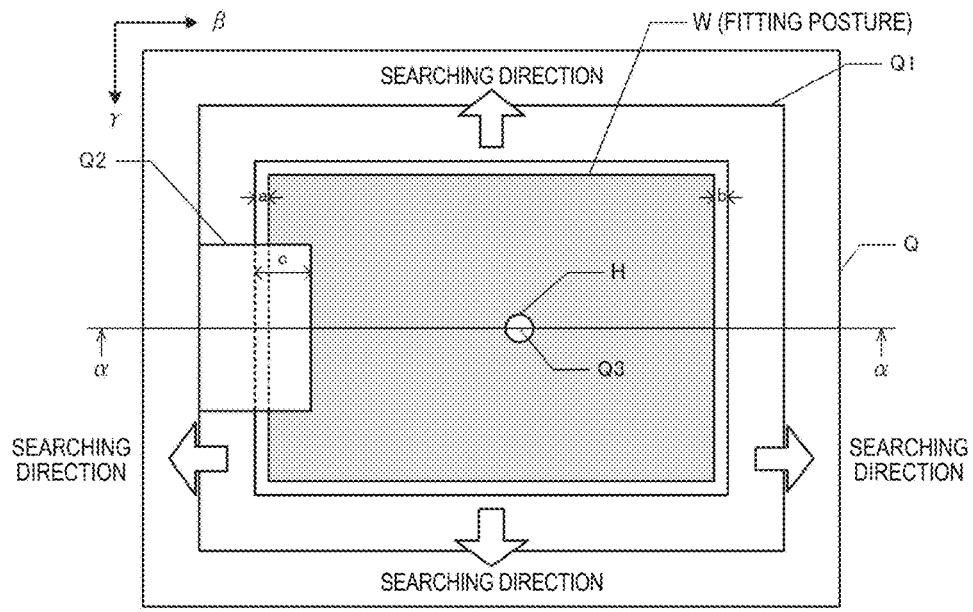
FIG. 3C is a plan view of the fitting member.

FIG. 3C is a plan view illustrating the fitting member W and the to-be-fitted member Q in the fitting operation when viewed in the δ-axis negative direction. As illustrated in FIGS. 3A to 3C, a rectangular frame-shaped frame portion Q1 protruding in the δ-axis negative direction is formed in the to-be-fitted member Q. The frame portion Q1 is formed to have a rectangular frame shape with sides in the β-direction and sides in the γ-direction. A space surrounded by the frame portion Q1 in the β and γ-directions is the recessed portion K, and the fitting member W in the fitting posture is present within the recessed portion K. In the fitting posture, directions of the outer edge sides of the fitting member W are the directions which become the β and γ-directions.

In the fitting operation, the control unit 31 controls the arm A by performing both the position control and the force control. The position control in the fitting operation includes posture control in which the fitting member W is caused to be in the above-described fitting posture, and position control in which the fitting member W is moved in a searching direction (a direction within the βγ-plane) on the periphery of a fitting position. The fitting position is a position where fitting of the fitting member W with respect to the to-be-fitted member Q in the fitting posture ends. The position where fitting of the fitting member W ends is a position where positions of the boss Q3 and the axial center of the fitting hole H coincide with each other, and a lower surface of the fitting member W comes into contact with the bottom surface of the recessed portion K. When the fitting member W is moved in the searching direction, the fitting member W may be randomly moved in the searching direction or may be moved in a track (a polyline track, a zigzag track, a spiral track, or the like) set in advance within the βγ-plane. The control unit 31 can cause the fitting member W to move in the searching direction by sequentially setting a position offset from the fitting position in the searching direction, to be the target position $S_t$. A fitting direction and the searching direction are directions orthogonal to each other.

As described above, the installation position and the installation direction of the to-be-fitted member Q and the fitting member W before being grasped are known. Therefore, the control unit 31 can set the target position $S_t$ (the fitting position or the like) of the TCP in the position control based on the installation position and the installation direction of the to-be-fitted member Q and the fitting member W before being grasped. However, an error can be included in the installation position and the installation direction of the to-be-fitted member Q and the fitting member W before being grasped. Therefore, the positions of the axial centers of the boss Q3 and the fitting hole H are not necessarily able to coincide with each other through the position control. Accordingly, the control unit 31 causes the arm A to perform an operation of searching for a position of the fitting member W by moving the fitting member W in the searching direction on the periphery of the fitting position so that the positions of the axial centers of the boss Q3 and the fitting hole H actually coincide with each other.

Meanwhile, the force control in the fitting operation is control for causing a force which the fitting member W receives from the to-be-fitted member Q in the fitting direction (the δ-direction) to be a predetermined target force $f_{St}$. As illustrated in FIGS. 3B and 3C, in a state where the boss Q3 is fitted into the fitting hole H, the outer edges of the fitting member W in the horizontal direction do not interfere with the frame portion Q1. Therefore, in a state where the boss Q3 is fitted into the fitting hole H, the lower surface of the fitting member W ideally receives a force in the δ-axis negative direction from the bottom surface of the recessed portion K. Therefore, the control unit 31 derives the force-originated correction amount ΔS through Equation (1) so that a target force $f_S$ acts vertically upward on the fitting member W, thereby controlling the arm A based on the derived force-originated correction amount ΔS. For example, as illustrated in FIG. 3A, in a case where the outer edges of the fitting member W interfere with the frame portion Q1 due to movement of the fitting member W in the searching direction and the action force $f_S$ in the XY-direction is detected, the force-originated correction amount ΔS for relaxing the action force $f_S$ is derived, and thus, it is possible to search for the position of the fitting member W so that the positions of the axial centers of the boss Q3 and the fitting hole H coincide with each other. In a case where the boss Q3 comes into contact with the lower surface of the fitting member W in a state where the positions of the axial centers of the boss Q3 and the fitting hole H do not coincide with each other, the action forces $f_S$ (torque) in the RX and RY-directions act and the force-originated correction amount ΔS relaxing the action force $f_S$ is derived. Thus, it is possible to search for the position of the fitting member W so that the positions of the axial centers of the boss Q3 and the fitting hole H coincide with each other.

Since the fitting member W is grasped by the arm A via the elastic portion P1, the fitting member W receives elastic impedance in the vertical direction by the metal spring, in the fitting operation. Therefore, there is no need to virtually realize elastic impedance by controlling the arm A. Thus, the control unit 31 performs the force control after the virtual elastic coefficient k in Equation (1) is set to zero.

In the fitting operation, the fitting member W can be reliably fitted into the to-be-fitted member Q by performing the position control and the force control described above after the positions of the axial centers of the boss Q3 and the fitting hole H are caused to coincide with each other until the lower surface of the fitting member W receives the target force $f_S$ from the bottom surface of the recessed portion K. In other words, even though an error is included in the fitting position which is specified based on the installation position and the installation direction of the to-be-fitted member Q and the fitting member W before being grasped, the fitting member W can be reliably fitted into the to-be-fitted member Q.

Incidentally, as illustrated in FIGS. 3A to 3C, a locking portion Q2 is formed in the to-be-fitted member Q. The locking portion Q2 is an interference structure for interfering with the fitting member W in a case where the fitting member W in the fitting posture moves in the fitting direction (the δ-direction) at a position where the positions of the axial centers of the boss Q3 and the fitting hole H coincide with each other. The locking portion Q2 protrude from the frame portion Q1 toward the inside of the recessed portion K in the β-direction. The protrusion length c in the β-direction is longer than a length (a+b) of a gap between the fitting member W and the frame portion Q1 in the β-direction. Therefore, even though the fitting member W is intended to be drawn out in the δ-axis negative direction from a state of being fitted into the to-be-fitted member Q, the fitting member W cannot be drawn out due to the interference of the locking portion Q2. On the contrary, even though the fitting member W in the fitting posture at a position on the δ-axis negative direction side closer than the locking portion Q2 is intended to be moved in the fitting direction (the δ-direction) and fitted, the fitting member W cannot be fitted due to the interference of the locking portion Q2. Therefore, in the present embodiment, the control unit 31 performs the preparation operation, the contact operation, and the posture change operation before performing the fitting operation illustrated in FIGS. 3A and 3B.

Figure 4:
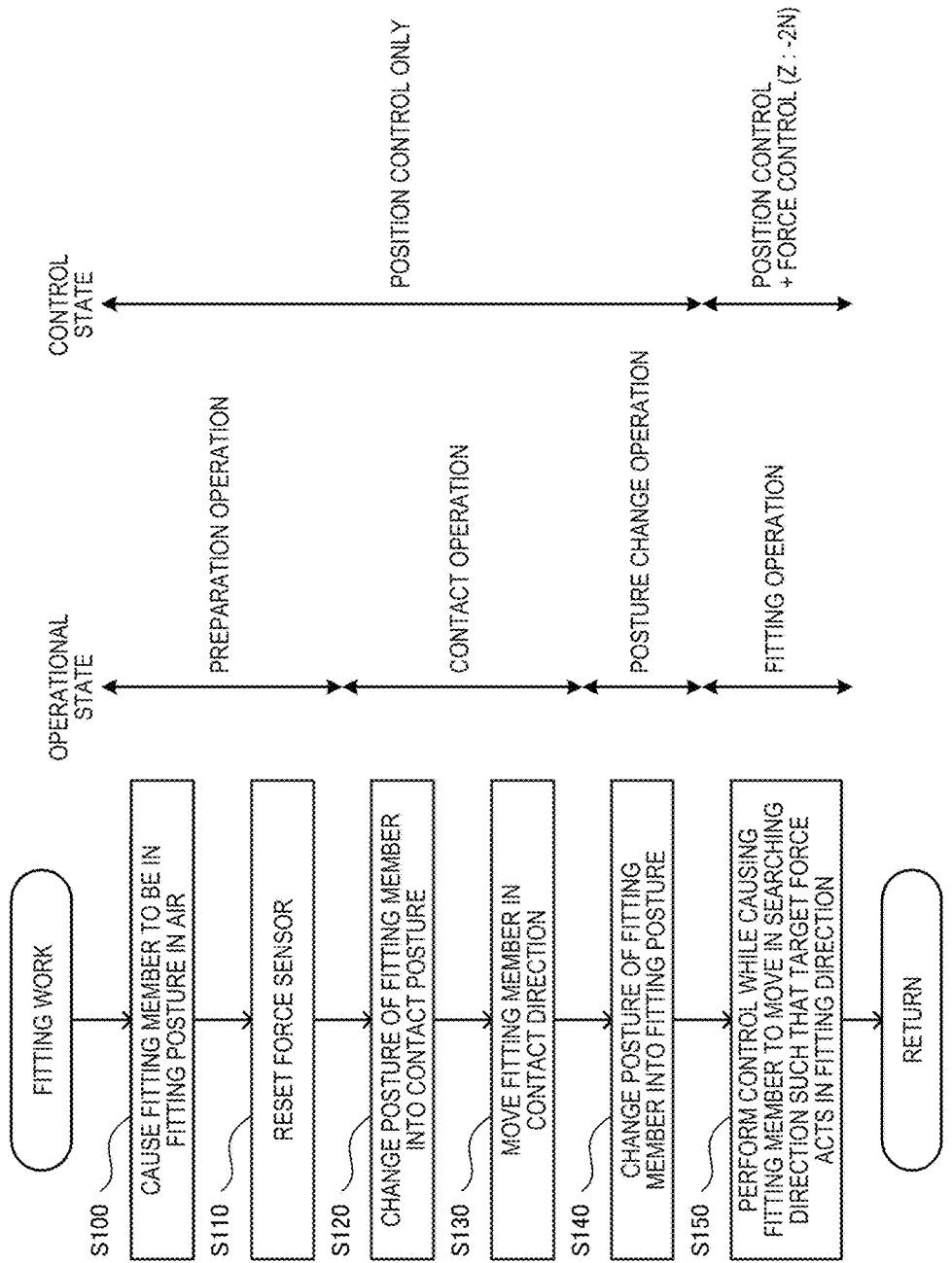
FIG. 4 is a flow chart of fitting work.

FIG. 4 is a flow chart of the fitting work. First, the control unit 31 causes the fitting member W to be in the fitting posture in the air (Step S100). In other words, the control unit 31 causes the end effector 2 to grasp the fitting member W and causes the posture of the fitting member W to be the same posture as the fitting posture in the air by controlling the arm A and the suction pump 4. The position of the fitting member W in Step S100 is a position where other subjects such as the to-be-fitted member Q do not interfere with the fitting member W so that only the gravity acts on the fitting member W.

Figure 5A:
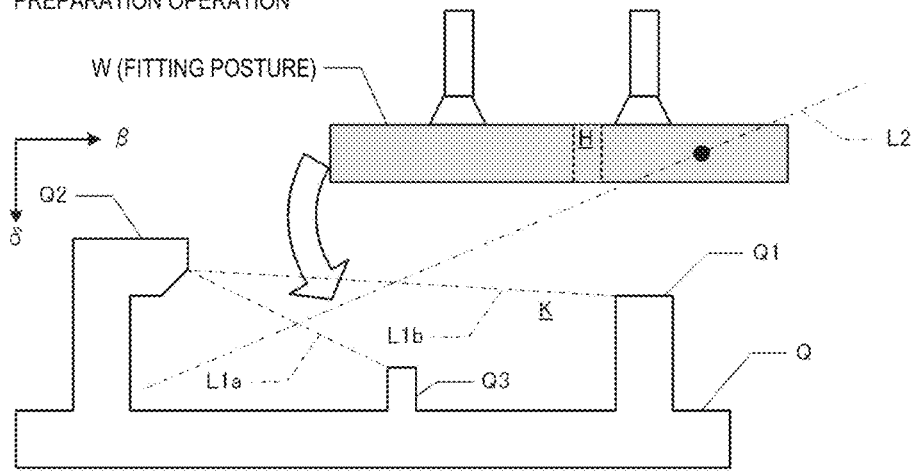
FIGS. 5A to 5C are side views of the fitting member.

FIG. 5A is an arrow view taken along line α-α (FIGS. 1A and 3C) illustrating a state of the fitting member W in Step S100. As illustrated in FIG. 5A, in Step S100, the fitting member W is in the fitting posture at a position in the vicinity of the to-be-fitted member Q. The position in the vicinity of the to-be-fitted member Q may be a position on the δ-axis negative direction side by a predetermined distance (for example, several centimeters) from the to-be-fitted member Q. In Step S100, the control unit 31 controls the arm A through only the position control.

Subsequently, the control unit 31 resets the force sensor FS (Step S110). In other words, as illustrated in FIG. 5A, the force sensor FS is reset in a state where only the gravity acts on the fitting member W in the fitting posture. The force sensor FS detects the detection values indicating the magnitude of forces applied to the three detection axes which are orthogonal to one another and the magnitude of torque around the three detection axes. However, the control unit 31 counts the detection value of each axis direction detected in a state where only the gravity acts on the fitting member W in the fitting posture, as zero. In other words, when the detection value of the force sensor FS in a state where only the gravity acts on the fitting member W in the fitting posture is counted as a reference value, an increased amount or a decreased amount of the detection value from the reference value denotes the detection value after being reset. In the present embodiment, the control unit 31 resets the force sensor FS by electrically resetting an output signal of the force sensor FS. In other words, in a configuration denoting that the detection value is zero when a voltage level or a current level of a signal of the force sensor FS exhibits the zero level, electrical countermeasures (a signal line is connected to the ground, and the like) in which the voltage level or the current level at the time of reset is caused to be the zero level are performed. After Step S120, when the force sensor FS is reset as described above, it is possible to perform the force control in accordance with the action force $f_S$ in which a force or torque originated from the gravity is compensated, without performing the gravity compensation based on the posture of the TCP. Steps S100 to S110 are the process of the preparation operation.

Subsequently, the control unit 31 changes the posture of the fitting member W into a contact posture (Step S120). The contact posture is a posture different from the fitting posture and is a posture realized by rotating the fitting member W around a predetermined horizontal rotary axis (the black dot in FIG. 5A) from the fitting posture in FIG. 5A such that the end portion on the locking portion Q2 side is lowered. Naturally, an error can be included in an actual contact posture as well. The horizontal rotary axis is an axis orthogonal to the β-direction that is a direction in which the locking portion Q2 protrudes. The lowered amount of the end portion of the fitting member W on the locking portion Q2 side is an amount greater than at least the thickness of the locking portion Q2. In Step S120, the control unit 31 controls the arm A through only the position control.

Figure 5B:
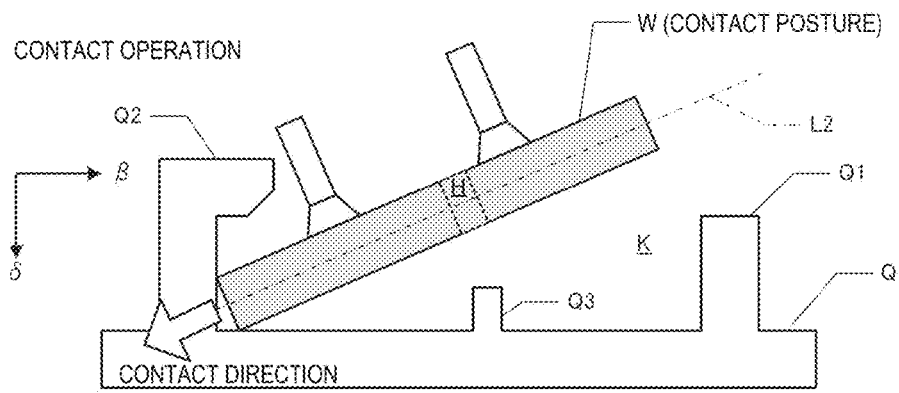
Figure 5C:
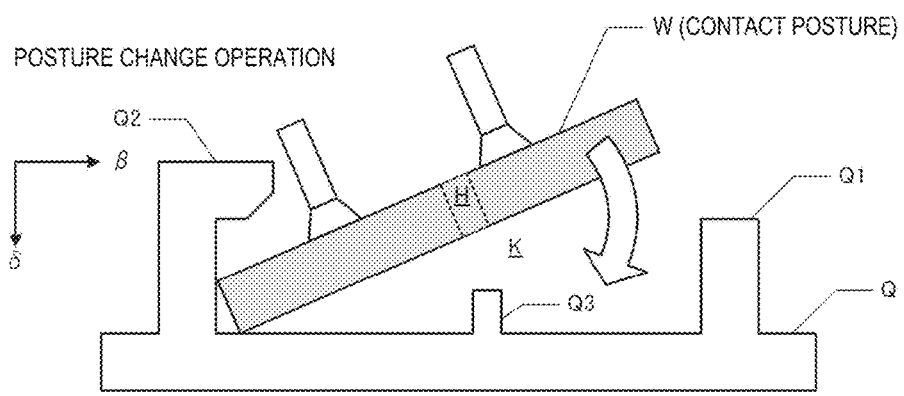

Subsequently, the control unit 31 causes the fitting member W to move in a contact direction (Step S130). The contact direction is a direction which is the plane direction of fitting member W in the contact posture and is a direction orthogonal to the γ-direction. FIG. 5B is an arrow view taken along line α-α (FIGS. 1A and 3C) illustrating a state of the fitting member W in Step S130. In FIGS. 5A and 5B, a locus L2 of the center line of the fitting member W in the thickness direction is indicated by the two-dot chain line. In Step S130, the control unit 31 controls the arm A through only the position control. The target position $S_t$ in the position control in Step S130 is set to a position which is lower than the locking portion Q2 and in which the end portion of the fitting member W on the locking portion Q2 side comes into contact with the frame portion Q1 of the to-be-fitted member Q.

Steps S120 to S130 can be smoothly performed by setting the horizontal rotary axis such that the center line of the fitting member W in the thickness direction after the posture change in Step S120 coincides with the locus L2. The track range of the fitting member W can be minimally suppressed and the possibility that the fitting member W interferes with an unintended portion (the locking portion Q2, the boss Q3, or the like) of the to-be-fitted member Q can be reduced by causing the contact direction to be the plane direction of fitting member W. For example, it is possible to reduce the possibility that the fitting member W interferes with the locking portion Q2, the boss Q3, or the frame portion Q1 by setting the locus L2 such that the locus L2 bisects each of a segment L1a connecting the locking portion Q2 and the boss Q3 at the shortest distance and a segment L1b (one-dot chain line in FIG. 5A) connecting the locking portion Q2 and the frame portion Q1 at the shortest distance. Steps S120 to S130 are the process of the contact operation.

Subsequently, the control unit 31 changes the posture of the fitting member W into the fitting posture (Step S140). In other words, the control unit 31 controls the arm A so that the plane direction of fitting member W becomes a direction parallel to the βγ-plane and directions of the sides at the outer edges of the fitting member W become the β and γ-directions. In Step S140, the control unit 31 controls the arm A through only the position control. According to Step S140, the fitting member W is in a state illustrated in FIG. 3A. In Step S140, the control unit 31 may change the posture of the fitting member W such that the position of the end portion on the locking portion Q2 side in the β-direction is not changed. In Step S140, the control unit 31 may change the posture of the fitting member W such that the position of the end portion on the locking portion Q2 side maintains a state of being on the fitting direction (the δ-direction) side from the locking portion Q2. Accordingly, it is possible to maintain a state where the end portion of the fitting member W enters the lower portion of the locking portion Q2. Step S140 is the process of the posture change operation.

Subsequently, the control unit 31 controls the arm A while causing the fitting member to move in the searching direction such that the target force $f_S$ acts in the fitting direction (the δ-direction) (Step S150). In other words, in Step S150, the control unit 31 causes the arm A to perform the above-described fitting operation. In the fitting operation, the control unit 31 performs the force control based on the action force $f_S$ detected by the force sensor FS. However, the gravity compensation of the action force $f_S$ based on the posture of the TCP is not performed. Since the force sensor FS is reset in Step S110 in a state where only the gravity acts on the fitting member W in the fitting posture, the action force $f_S$ having the gravity substantially compensated is obtained. Therefore, without performing the gravity compensation based on the posture of the TCP, it is possible to realize the force control in which the influence of the gravity is eliminated and a reaction force from the to-be-fitted member Q acting in the fitting direction is caused to be the target force $f_{St}$.

In the fitting operation in which the fitting posture is caused to be a target posture, the posture of the fitting member W maintains a posture close to the fitting posture. Accordingly, substantial gravity compensation can be realized. Particularly, in the present embodiment, the fitting member W is grasped by the elastic portion P1, the correlationship between the posture of the TCP and the posture of the fitting member W is weakened. In other words, even in the same postures of the TCP, extending amounts of the elastic portion P1 vary due to a slight difference or the like between relative positions of the elastic portion P1 and the center of gravity of the fitting member W. Consequently, there is the possibility that the posture of the fitting member W varies. That is, in a case where the relative positions of the elastic portion P1 and the center of gravity of the fitting member W when an offset value of the gravity compensation is researched for every posture of the TCP are different from the relative positions of the elastic portion P1 and the center of gravity of the fitting member W when the actual fitting work is performed, there is a concern that accuracy of the gravity compensation performed based on the posture of the TCP is deteriorated. In contrast, the force sensor FS is reset and the fitting operation is performed in the same fitting posture while the fitting member W is grasped. Therefore, it is possible to realize the substantial gravity compensation with accuracy higher than the gravity compensation performed based on the posture of the TCP.

Here, since the force control is not performed in the contact operation, control in the contact operation can be simplified. In the contact operation, the fitting member W takes the contact posture different from the fitting posture. Accordingly, the substantial gravity compensation is not realized by only resetting the force sensor FS. However, since the force control is not performed, the fitting member W can be appropriately handled without receiving the influence of the gravity. Since the force control is not performed in the contact operation, elastic impedance is not virtually realized by the arm A. However, since the fitting member W is grasped by the arm A via the elastic portion P1, a shock of contact can be relaxed through mechanical elastic impedance of the elastic portion P1. Since a shock of contact can be relaxed through a mechanical response of the elastic portion P1 not by controlling the arm A, the influence of shock can be reliably removed at a high speed.

3. Other Embodiments

The robot 1 is not necessarily a six-axis single arm robot. The robot 1 may be a robot in which a force acts on a certain place in accordance with driving of the robot. For example, the robot 1 may be a double arm robot and may be a SCARA robot. The force detector does not need to be the force sensor FS. The force detector may be a torque sensor which detects torque acting on the joints J1 to J6 for each of the joints J1 to J6. Instead of the torque sensor, torque may be detected based on loads applied to the motors M1 to M6. In this case, teaching of the parameters of the impedance control may be performed together with the target torque in the joints J1 to J6.

In the above-described embodiment, the force sensor FS is electrically reset. However, the force sensor FS may be reset by a different method. For example, the detection value of the force sensor FS during the preparation operation may be stored as the offset value so that the detection value of the force sensor FS is arithmetically reset by subtracting the offset value from the detection value of the force sensor FS in the force control thereafter. In the above-described embodiment, forces in the directions of three detection axis detected by the force sensor FS, and the detection value indicating the torque around the detection axis are reset. However, the action force $f_S$ after being converted into a force in the robot coordinate system may be reset. Moreover, it is desirable that the fitting posture during the preparation operation (resetting) and the fitting posture during the fitting operation are the same as each other. However, as long as the fitting postures are similar to each other to a certain extent, it is possible to realize substantial gravity compensation. For example, the posture of the fitting member W during the preparation operation and the posture of the fitting member W during the fitting operation may be recognized by a camera or the like, and in a case where a difference between the postures is equal to or less than a threshold value, the gravity compensation performed based on the posture of the TCP may be skipped.

Moreover, the force sensor FS is not necessarily reset. In other words, in the fitting operation, resetting of the force sensor FS in the preparation operation may be omitted on the promise that the gravity compensation is performed based on the posture of the TCP.

In the above-described embodiment, only the fitting operation is performed through the position control and the force control. However, the contact operation may also be performed through the position control and the force control. For example, the control unit 31 may set the target force $f_{St}$ regarding the action force $f_S$ in a direction opposite to the contact direction. Accordingly, the arm A can be controlled so as to be in a state where a reaction force of the target force $f_{St}$ acts on the fitting member W from the to-be-fitted member Q. Therefore, the fitting member W can be reliably brought into contact with the to-be-fitted member Q. In the force control in the contact operation, the virtual elastic coefficient k may be set to zero in consideration of elasticity of the elastic portion P1. Moreover, the preparation operation may be performed through the position control and the force control. In other words, the target force $f_{St}$ may be set so as to be in a state where only the gravity acts in the preparation operation.

Moreover, the fitting member W is not necessarily grasped by the arm A via the elastic portion P1. In other words, the end effector 2 and the fitting member W may form a substantially integrated rigid body by causing the end effector 2 to grasp the fitting member W. In this case, an effect of relaxing the shock caused by the elastic portion P1 is no longer realized. However, the shock of the fitting member W with respect to the to-be-fitted member Q may be relaxed by performing the force control in which the virtual elastic coefficient k is not caused to be zero in the contact operation or the fitting operation.

The shapes of the fitting member W and the to-be-fitted member Q are not limited to the shapes of the above-described embodiment. The to-be-fitted member Q is acceptable as long as the to-be-fitted member Q has the interference structure for interfering in a case where the fitting member W in the fitting posture moves in the fitting direction, and various forms can be conceived for the interference structure. In other words, the interference structure is acceptable as long as the interference structure overlaps a region where the fitting member W is present and the interference structure is a portion of the to-be-fitted member Q present on the viewpoint side closer than the fitting member W when the fitting member W and the to-be-fitted member Q are viewed from the viewpoint on the opposite side in the fitting direction (the δ-axis negative direction) in a state of being fitted. For example, the interference structure may be an insertion structure in which a pillar portion formed in the fitting member W is inserted, and the interference structure may be an engagement structure in which an engagement claw formed in the fitting member W is engaged. Naturally, the fitting member W and the to-be-fitted member Q are not necessarily rectangular, and the fitting member W is not necessarily plate-shaped. The arm A is acceptable as long as the arm A at least grasps the fitting member W, and the robot may be a double arm robot which grasps both the fitting member W and the to-be-fitted member Q. Naturally, the member which is grasped by the arm A may have the shape of the to-be-fitted member Q, and the member which is not grasped by the arm A may have the shape of the fitting member W.

The entire disclosure of Japanese Patent Application No. 2015-111967, filed Jun. 2, 2015 is expressly incorporated by reference herein.

What is claimed is:

1. A robot control system comprising:
an arm that is configured with a plurality of sub-arm members and a joint, the joint being provided between two adjacent sub-arm members of the plurality of sub-arm members;
an end effector that is provided at an end of the arm, the end effector being configured to grasp a fitting member, the fitting member having one of a projection and a hole;
a plurality of motors that are configured to relatively drive the plurality of sub-arm members so as to move the arm, one of the plurality of motors being configured to drive the end effector so that the end effector grasps the fitting member;
a force detector that is adjacent to the end effector, the force detector being configured to detect force applied to the end effector so as to output a detection signal;
a memory that is configured to store computer-readable instructions; and
a processor that is configured to execute the computer-readable instructions so as to:
cause the arm and the end effector to perform an initial operation in which the fitting member grasped by the end effector is positioned at a first fitting posture with respect to a fitted member, the fitted member having the other of the projection and the hole;
cause the arm and the end effector to perform a first posture change operation in which the fitting member grasped by the end effector is positioned at a contact posture by inclining the fitting member in a first direction from the first fitting posture with respect to the fitted member;
cause the arm and the end effector to perform a contact operation in which the fitting member grasped by the end effector is moved in a contact direction and is brought into contact with part of the fitted member while the fitting member is inclined with respect to the fitted member;
cause the arm and the end effector to perform a second posture change operation in which the fitting member is positioned at a second fitting posture changed from the contact posture by inclining the fitting member in a second direction opposite to the first direction with respect to the fitted member; and
cause the arm and the end effector to perform a fitting operation in which the fitting member in the second fitting posture is moved along a searching plane, and while the fitting member is moved along the searching plane, the fitting member is pressed toward the fitted member with a pressing force in a fitting direction so that the projection is fit into the hole,
wherein the contact direction, all extending directions within the searching plane, and the fitting direction are different from one another, and
the processor is configured to adjust the pressing force in accordance with the detection signal from the force detector.

2. The robot control system according to claim 1, wherein the end effector has an elastic member so that the end effector grasps the fitting member via the elastic member.

3. The robot control system according to claim 1, wherein the detection signal from the force detector corresponds to a reference force when the fitting member grasped by the end effector is positioned at the first fitting posture, and
the processor is configured to adjust the pressing force in accordance with the reference force.

4. A robot control apparatus of a robot, the robot including:
an arm that is configured with a plurality of sub-arm members and a joint, the joint being provided between two adjacent sub-arm members of the plurality of sub-arm members;
an end effector that is provided at an end of the arm, the end effector being configured to grasp a fitting member, the fitting member having one of a projection and a hole;
a plurality of motors that are configured to relatively drive the plurality of sub-arm members so as to move the arm, one of the plurality of motors being configured to drive the end effector so that the end effector grasps the fitting member; and
a force detector that is adjacent to the end effector, the force detector being configured to detect force applied to the end effector so as to output a detection signal,
the robot control apparatus comprising:
a memory that is configured to store computer-readable instructions; and
a processor that is configured to execute the computer-readable instructions so as to:
cause the robot to perform an initial operation in which the fitting member grasped by the end effector is positioned at a first fitting posture with respect to a fitted member, the fitted member having the other of the projection and the hole;
cause the robot to perform a first posture change operation in which the fitting member grasped by the end effector is positioned at a contact posture by inclining the fitting member in a first direction from the first fitting posture with respect to the fitted member;
cause the robot to perform a contact operation in which the fitting member grasped by the end effector is moved in a contact direction and is brought into contact with part of the fitted member while the fitting member is inclined with respect to the fitted member;
cause the robot to perform a second posture change operation in which the fitting member is positioned at a second fitting posture changed from the contact posture by inclining the fitting member in a second direction opposite to the first direction with respect to the fitted member; and
cause the robot to perform a fitting operation in which the fitting member in the second fitting posture is moved along a searching plane, and while the fitting member is moved along the searching plan, the fitting is pressed toward the fitted member with a pressing force in a fitting direction so that the projection is fit into the hole, wherein the contact direction, all extending directions within the searching plane, and the fitting direction are different from one another, and the processor is configured to adjust the pressing force in accordance with the detection signal from the force detector.

5. A robot control method of a robot for causing a processor to execute computer-readable instructions stored in a memory, the robot including:

an arm that is configured with a plurality of sub-arm members and a joint, the joint being provided between two adjacent sub-arm members of the plurality of sub-arm members;

an end effector that is provided at an end of the arm, the end effector being configured to grasp a fitting member, the fitting member having one of a projection and a hole;

a plurality of motors that are configured to relatively drive the plurality of sub-arm members so as to move the arm, one of the plurality of motors being configured to drive the end effector so that the end effector grasps the fitting member; and a force detector that is adjacent to the end effector, the force detector being configured to detect force applied to the end effector so as to output a detection signal, the robot control method comprising executing on the processor the steps of:

performing an initial operation in which the fitting member grasped by the end effector is positioned at a first fitting posture with respect to a fitted member, the fitted member having the other of the projection and the hole;

performing a first posture change operation in which the fitting member grasped by the end effector is positioned at a contact posture by inclining the fitting member in a first direction from the first fitting posture with respect to the fitted member;

performing a contact operation in which the fitting member grasped by the end effector is moved in a contact direction and is brought into contact with part of the fitted member while the fitting member is inclined with respect to the fitted member;

performing a second posture change operation in which the fitting member is positioned at a second fitting posture changed from the contact posture by inclining the fitting member in a second direction opposite to the first direction with respect to the fitted member; and performing a fitting operation in which the fitting member in the second fitting posture is moved along a searching plane, and while the fitting member is moved along the searching plane, the fitting member is pressed toward the fitted member with a pressing force in a fitting direction so that the projection is fit into the hole, wherein the contact direction, all extending directions within the searching plane, and the fitting direction are different from one another, and the processor is configured to adjust the pressing force in accordance with the detection signal from the force detector.

* * * * *